UNITED STATES PATENT OFFICE.

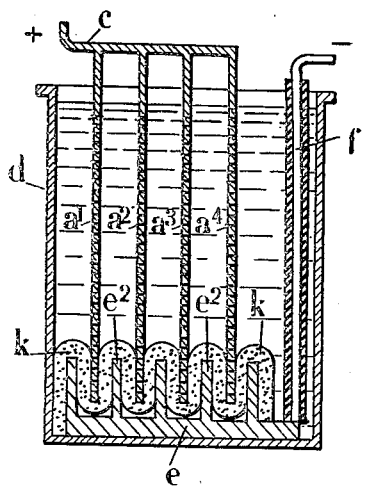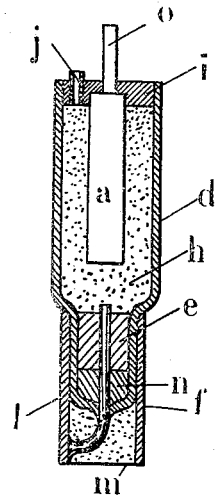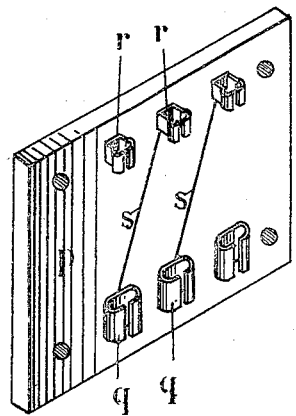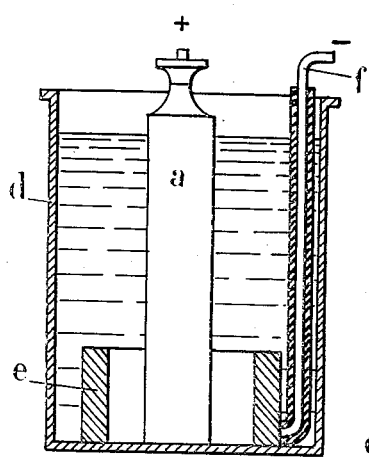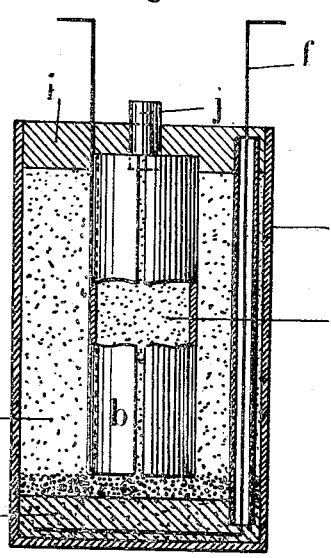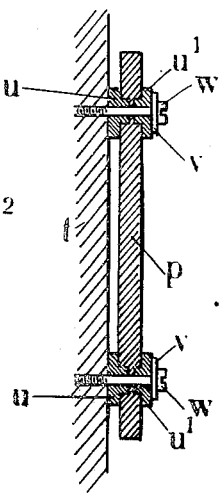

CHARLES JEAN VICTOR FÉRY, OF PARIS, FRANCE.

ELECTRIC STORAGE BATTERY.

1,371,746.  Specification of Letters Patent.  Patented Mar. 15, 1921.

Application filed March 24, 1919. Serial No. 284,823.

*To all whom it may concern:*

Be it known that I, CHARLES JEAN VICTOR FÉRY, of 10 Rue Vauquelin, Paris, France, doctor of sciences, professor, have invented Improvements in Electric Storage Batteries, of which the following is a full, clear, and exact description.

This invention has for its object to provide an improved electric storage battery capable of replacing what are known as dry batteries. The improved storage battery comprises a cell having a "fixed" liquid, which is easily transportable and is capable of being regenerated by recharging.

The present invention has more particularly for its object to diminish local wear and to avoid a spontaneous discharging of the battery and also to do away with the drawbacks resulting from the use of a free liquid. It is well known that a Planté cell loses daily about 1% of its charge. Further, the presence of free acids in storage batteries of that type renders the latter difficult to transport, and diminishes its applications.

The improved storage battery forming the subject matter of the present invention comprises essentially:

(a) a simple or multiple positive electrode of lead peroxid arranged vertically.

(b) a single negative electrode arranged horizontally at the bottom of the cell jar.

(c) a porous material unaffected by sulfuric acid, such as sand, pumice, etc., serving to keep the two electrodes in place.

For the purpose of diminishing the internal resistance of the cell while retaining its advantages as above set forth, and of enabling it to give greater currents, the negative electrode which is always located in the lower part of the jar, may be so shaped as to present to the positive electrode, one or more vertical surfaces, the height of which is appreciably less than that of the liquid in the jar in order to retain the advantages of small local wear.

This invention may be applied to all types of storage batteries comprising a negative electrode brought to a state of extreme reduction, in consequence of which it has a great tendency to become oxidized. It is also more particularly applicable to storage batteries comprising an alkaline electrolyte on the Edison system, in which the negative electrode consists of iron reduced by electrolytic hydrogen, which is known in chemistry by the name of pyrophoric iron and has the property, as is well known, of catching fire when it is thrown into the air, producing sesquioxid of iron $Fe_2O_3$.

From the nature of the negative electrode of this type of storage battery, it will be readily understood how important the application of the present invention is for the purpose of shielding the active material constituting this negative electrode, from contact with the air.

The present invention is equally applicable to the construction of batteries of high voltage which may rise to several hundreds of volts, such as are used for example for electric measuring purposes in researches on the ionization of gases, for wireless telegraphy with an audion, etc.

In these various applications the voltage must be high, but the current is very weak, so that the cells that have to supply the current may be very small so long as they retain their charge and the insulation is good.

The present invention has further for its object to provide a constructional form of this application which will allow of producing under practical conditions a storage battery composed of cells of small dimensions which are completely insulated and retain their charge. This apparatus is further characterized by the peculiar manner of mounting the said cells which is carried out in such a manner as to allow of using at will any desired varying number of cells, removing quickly a defective cell and replacing it immediately by a cell in good condition.

The accompanying drawings illustrate by way of example several constructional forms of the present invention.

Figs. 3, 4 and 5 are vertical sections of three other constructional forms.

Fig. 6 is a vertical section of a storage battery on the Edison system with a fixed liquid, to which the present invention is applied.

Figs. 7 to 9 illustrate the application of this invention for the purpose of providing a storage battery of high voltage composed of cells of small dimensions adapted to be removed and replaced with ease.

Fig. 7 is a vertical section of a cell.

Fig. 8 shows the board on which the cells are mounted, and

Fig. 9 is a vertical cross section of the device for attaching the board.

Figure 1:
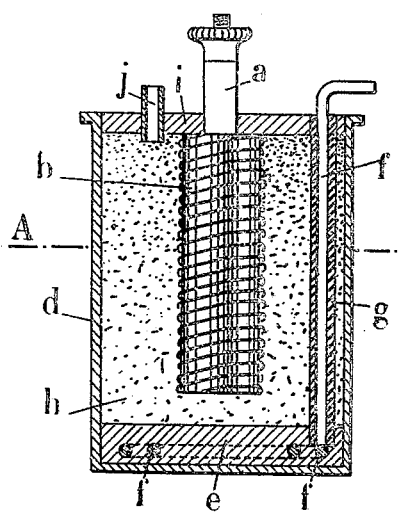
Figure 1 is a vertical section of one of these constructional forms.
Figure 2:
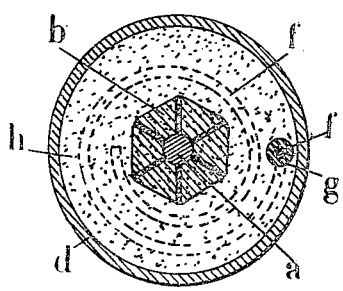
Fig. 2 is a horizontal section on the line A—A of Fig. 1.

In the constructional form shown in Figs. 1 and 2, the positive electrode consists of a leaden cylinder $a$ having ribs between which the active material is introduced; a leaden wire $b$ wound in the form of a spiral, serves to keep this active material in place.

Figure 3:
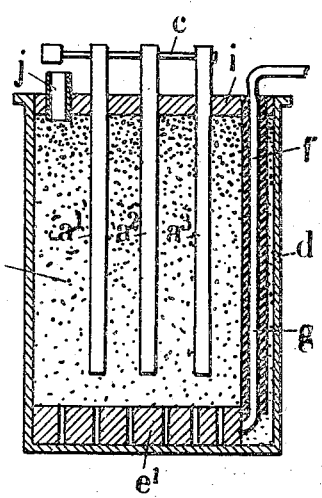

This positive electrode may be constituted also by a plurality of ordinary vertical plates $a^1$, $a^2$, $a^3$ in any desired number connected together by a metal rod $c$ as shown in Fig. 3.

Any other known arrangement may be employed; for instance this positive electrode may consist of a vertical cylinder of peroxidized lead.

The negative electrode of which only one is present in each cell, is located horizontally on the bottom of the insulating jar $d$.

This electrode may be formed by pouring on to the bottom of this jar a paste $e$ of litharge and water acidulated with sulfuric acid, and embedding in this paste a leaden wire $f$ (Figs. 1 and 2), which latter is extended and bent over in such a manner as to form a vertical branch serving as a current outlet terminal. This vertical branch is protected by an insulating sheath $g$, of any material, for instance glass.

This negative electrode may also be constituted by an ordinary plate $e^1$ (Fig. 3) placed horizontally and resting on the bottom of the jar $d$.

The two electrodes, positive and negative, are kept in place by a porous material $h$ (such as sand, pumice, etc.) unaffected by sulfuric acid.

The jar $d$ is closed by a layer of glue $i$ or any other insulating material. An aperture $j$ is provided in this insulating layer for the escape of the gases.

By reason of its peculiar constitution the improved storage battery has the following main advantages:

1. Owing to its vertical position the positive electrode is not subjected to the risk of becoming deformed in any way. If, on the contrary, it were arranged horizontally, it would tend to assume a curved form because during the charging its lower face would be subjected to powerful expansion.

2. The horizontal position of the negative electrode at the bottom of the jar prevents sulfatation on open circuit, because this electrode is protected on the one hand against the action of the oxygen of the air which always dissolves in the superficial liquid of ordinary cells, and it is situated on the other hand in a horizontal zone where the liquid has a constant density and composition.

It is well known by all experts that in ordinary storage batteries the negative pastilles of the upper portion of a worn plate are always more corroded than those of the lower portion. This drawback is due to the fact that the heavy sulfate of lead solution which collects at the bottom of the tank, has a less intense reaction than the superficial liquid, and consequently a parasitic electrolytic action takes place between the upper portion and the lower portion of the plate. This drawback is therefore obviated in the improved storage battery by the peculiar arrangement of the negative electrode.

Owing to these special results, this arrangement of horizontal negative electrode may be employed with equal advantage to storage batteries containing free liquid.

3. The presence of the fixing material diminishes convection and protects the negative electrode from the oxidizing action of the superoxidized liquids generated at the positive electrode, thereby assuring the conservation of the charge.

The improved storage battery recovers rapidly its energy during rest, and is thus similar to manganese cells with this advantage that it can give out considerably more current that the latter while having a smaller bulk.

The improved storage battery has further the advantage of being capable of being very easily recharged.

In the constructional form shown in Fig. 4, the negative electrode $e$ has vertical ribs $e^2$ which by their extent increase considerably the surface of this electrode. The height of these vertical ribs must however be considerably less than the height of the liquid in the jar $d$, in order that the advantages of a small local wear shall be preserved. Contact is made with this negative electrode by a vertical leaden rod $f$ insulated by means of varnish or an insulating tube, for instance of glass, ebonite, etc.

The positive electrode comprises a certain number of plates $a^1$, $a^2$, $a^3$, $a^4$ connected together at their upper parts by a metal rod $c$ in the usual manner, their lower ends fitting between the vertical ribs $e^2$ of the negative electrode $e$.

Between the lower ends of these plates $a^1$, $a^2$, $a^3$, $a^4$ and the vertical ribs of the negative electrode $e$, there is interposed an insulating fabric $k$ that is unaffected by sulfuric acid, for instance asbestos cloth, glass cloth, etc. In cases where the liquid of the storage battery is not fixed, the fabric $k$ has preferably a corrugated form as shown in Fig. 4, for the purpose of keeping back the particles of positive active material that may fall down.

The liquid in the cell may be fixed in the usual manner by a suitable porous material such as silica or any other absorbing powder unaffected by sulfuric acid.

This construction as well as that above described, has in addition to the advantage of a complete conservation of the charge, that of completely avoiding the sulfatation of the negative electrode which takes place at the upper part of the plates in ordinary storage batteries, and which is particularly active when by reason of the evaporation, the level of the liquid sinks below the upper part of the electrodes, whereby the latter come into direct contact with the air.

This drawback is completely avoided by the arrangement hereinbefore described, since only the positive plates which have nothing to fear from coming into contact with the air, are capable of emerging from the liquid owing to the evaporation of the latter.

Fig. 5 illustrates another constructional form in which the positive electrode $a$ is cylindrical and constituted like the arrangement shown in Fig. 1. The negative electrode $e$ is of annular shape and the current is taken from the latter by means of an insulated leaden wire $f$.

The liquid in the cell may be fixed as above stated. In cases where this fixing is not effected, a porous and refractory insulating fabric, for instance asbestos cloth, is interposed between the negative electrode $e$ and the positive electrode $a$, for the purpose of avoiding short circuits between the two electrodes.

In the construction shown in Fig. 6, the improved storage cell comprises a negative electrode $e^1$ composed of a mixture of iron oxid and powdered graphite well packed on the bottom of a jar $d$ of insulating material. Upon this mixture there is packed a not too thick layer $h$ of porous material that is unaffected by alkaline solutions, such as calcined magnesia, calcined lime, calcined aluminate of lime or magnesia, and the jar is then filled up with the same porous material $h$.

This porous material $h$ is moistened with an alkaline solution such as potash, soda, or preferably a mixture of potash and soda, so that the solution shall have a minimum resistivity.

The positive electrode consists of an elastic cylindrical sheath $b$ of pure nickel inside of which oxid of nickel $b^2$ is packed. This sheath $b$ may be closed by a coiled strip of pure nickel or by a creased tube, etc., in such a manner as to have a sufficient elasticity to remain always in electric contact with the active material contained in said sheath, notwithstanding the variations in volume of the said active material.

The positive electrode carries at its upper part a tube $j$ for the escape of the gases.

The jar $d$ is closed by a layer of insulating material $i$.

When a storage cell constructed as above described, is charged, the iron oxid is reduced to the state of metallic iron, and the precipitated green nickel oxid $b^2$ is converted into black peroxid.

A small quantity of baryta added to the alkaline solution, facilitates considerably the peroxidation of the positive electrode, forming barium dioxid which peroxidizes the nickel oxid by catalytic action.

In this storage cell shown in Fig. 6, the cylindrically coiled strip $b$ constituting the positive electrode will, by reason of its elasticity, give way to the considerable swelling up due to the peroxidation of the nickel oxid. The mean voltage of this storage cell during discharge is about 1.40 volts.

The positive electrode may also be constituted by a strip of silver coiled in the form of a cylinder and containing precipitated silver oxid. The general reactions are the same as above, but in this case the mean voltage during the discharge is about 1,9 to 2 volts. The cell thus constituted has great power relatively to its bulk.

In the case of large cells, the number of positive electrodes may be increased in order to avoid the use of a single electrode of too large diameter wherein the active material situated in the middle would be badly utilized. The several positive electrodes would be connected together as stated in the main patent.

Generally speaking, the apparatus forming the subject matter of the present invention is applicable without any difficulty whatever to all reversible combinations wherein a very oxidizable negative electrode has to be protected against the oxidizing action of the air.

In the construction shown in Fig. 7, each cell of the battery consists of a glass tube $d$ closed at its lower end, and through the bottom of which there extends a leaden wire $f$ constituting the negative electrode. This leaden wire is embedded inside the tube in a paste $e$ of litharge and water acidulated with sulfuric acid; it is soldered externally to a socket of copper or brass $l$ fixed to the glass tube $d$ by means of plaster $m$; it constitutes a negative terminal.

On the bottom of the tube $d$ there is poured a small layer of marine glue $n$, or any cement unaffected by sulfuric acid, for the purpose of making a tight joint at the lower part of the tube.

The litharge paste is covered by a layer $h$ of about ½ centimeter thickness, of the selected fixing agent (sand, powdered porcelain, etc.).

The positive electrode $a$ consisting for instance of red lead, is immersed in the glass tube $d$ above the said layer $h$, and the tube $d$ is filled with the same porous material.

The glass tube $d$ is closed at its upper end by a layer of glue $i$ or any other insulating material unaffected by sulfuric acid. A small tube $j$ extending through this insulating layer $i$, allows of moistening the porous mass with acid, and serves for the escape of gases.

The tail $o$ of the positive electrode $a$ may consist with advantage of tin or an alloy of tin and antimony, which is harder and less expensive than pure tin. The use of tin or of its alloy with antimony for the constitution of the tail of the positive electrode, prevents the creeping of acid that always occurs when this tail is made of pure lead or antimoniated lead.

The same result may also be obtained in a more economical manner by employing a tail made of lead and tinning the latter by immersion into a bath of molten tin.

The mounting of cells constructed as hereinbefore described, in the form of a battery, may be effected in a very simple manner on a board $p$ (Fig. 8) of paraffined wood or other insulating material, carrying two horizontal rows of elastic brass clips. In the lower clips $q$ are inserted the sockets $l$ constituting the negative terminals of the cells. In the upper clips $r$ of smaller internal diameter the tails $o$ of the positive electrodes are clamped. Each lower clip $q$ is connected by an oblique wire $s$ to the upper clip $r$ intended to receive the next following cell. In this way the negative pole of each cell is connected to the positive pole of the adjacent cell. It is to be noted that with this kind of mounting the insulating resistance of the board $p$ increases with the length of the latter, and consequently with the potential difference that is to be insulated.

The board $p$ may be fixed to a wall $t$ (Fig. 9). Insulators $u$, $u^1$ for instance of porcelain, are interposed between this board and the wall $t$ on the one hand, and the metal washer $y$ on the other hand that is placed under the head of each fixing screw $w$.

This arrangement has the advantage of assuring a good insulation of the cells by means of air. Further it is to be noted that the board being kept away from the wall, is not liable to become wet and consequently conducting.

In this way a plurality of boards provided with cells can be fixed on one and the same wall, by connecting the poles of the several batteries in such a manner as to sum the voltages of the latter. In this way with a very small bulk a storage battery can be constructed comprising a very large number of cells, and furnishing current of very high voltage.

It is to be understood that the hereinbefore described shapes, dimensions and constructional details of the improved storage cells and batteries, may be modified, without departing from the nature of the invention.

What I claim is:—

1. In an electric storage battery, in combination, a lead cell jar with a "fixed" solution of sulfuric acid, a lead negative electrode horizontally arranged at the bottom of the jar and a positive electrode of peroxid of lead arranged vertically above the horizontal negative electrode, and presenting the same horizontal section relatively to the horizontal surface occupied by the negative electrode so that during the charging operation, an upward movement of the $SO_4$ ions may be produced throughout the height of the jar, tending to maintain constant the degree of concentration of the acid and that the reducing gases evolved at the negative electrode may escape without reacting on the positive electrode.

2. An electric storage battery as claimed in claim 1 wherein a negative electrode is provided opposite said positive electrode with one or more vertical surfaces whose height is appreciably less than that of the liquid in said jar, whereby the internal resistance of the cell is diminished, and the cell is enabled to discharge larger currents, and local wear is lessened.

3. An electric storage battery as claimed in claim 1 wherein the negative electrode is formed with vertical ribs, and the vertical positive electrode is composed of plates having their lower ends interposed between the ribs of the negative electrode, and the insulating fabric unaffected by acid interposed between the two electrodes.

4. An electric storage battery as claimed in claim 1 wherein means is provided for keeping the negative electrode away from the action of the air dissolved in the upper portion of said solution.

5. In an electric storage battery of the Edison type comprising an alkaline electrolyte, a vertical positive electrode, and a negative electrode consisting of iron reduced by means of electrolytic hydrogen.

6. In an electric storage cell, the combination with the cell jar of insulating material, of a fixed liquid in said cell, a negative electrode consisting of a mixture of iron oxid and powdered graphite packed on the bottom of said jar, a shallow layer of a porous material unaffected by alkaline solutions packed on said mixture, a porous material moistened with an alkaline solution containing preferably an addition of a small quantity of baryta, filling said jar, and a vertical positive electrode consisting of an elastic cylindrical sheath of pure nickel containing an internal packing of nickel oxid.

7. In an electric storage cell, the combination with the cell jar of insulating material, of a fixed liquid in said cell, a negative electrode consisting of a mixture of iron oxid and powdered graphite packed on the bottom of said jar, a shallow layer of a porous material unaffected by alkaline solutions packed on said mixture, a porous material moistened with an alkaline solution containing preferably an addition of a small quantity of baryta, filling said jar, and a vertical positive electrode consisting of an elastic cylindrical silver sheath containing precipitated silver oxid.

8. In an electric storage cell, the combination of a cell jar constituted by a glass tube closed at its lower end, a paste of litharge and water acidulated with sulfuric acid in said tube, a leaden wire connected to said negative electrode extending through the bottom of said tube, said leaden wire being immersed inside said tube in said paste of litharge and acidulated water, a socket of copper or brass mounted on said glass tube, constituting the negative terminal, and a soldered joint connecting said leaden wire to the outside of said socket.

9. In an electric storage cell, the combination with the cell jar, of a negative electrode located horizontally on the bottom of said jar, a vertical positive electrode, and a tail on said positive electrode made of lead tinned by immersion in a bath of molten tin.

The foregoing specification of my improvements in electric storage batteries, signed by me, this 24th day of February, 1919.

CHARLES JEAN VICTOR FÉRY.